Nov. 2, 1965　　　　H. E. WEISBERG　　　　3,215,663
PROCESS FOR PIGMENT DISPERSION
Filed June 23, 1961
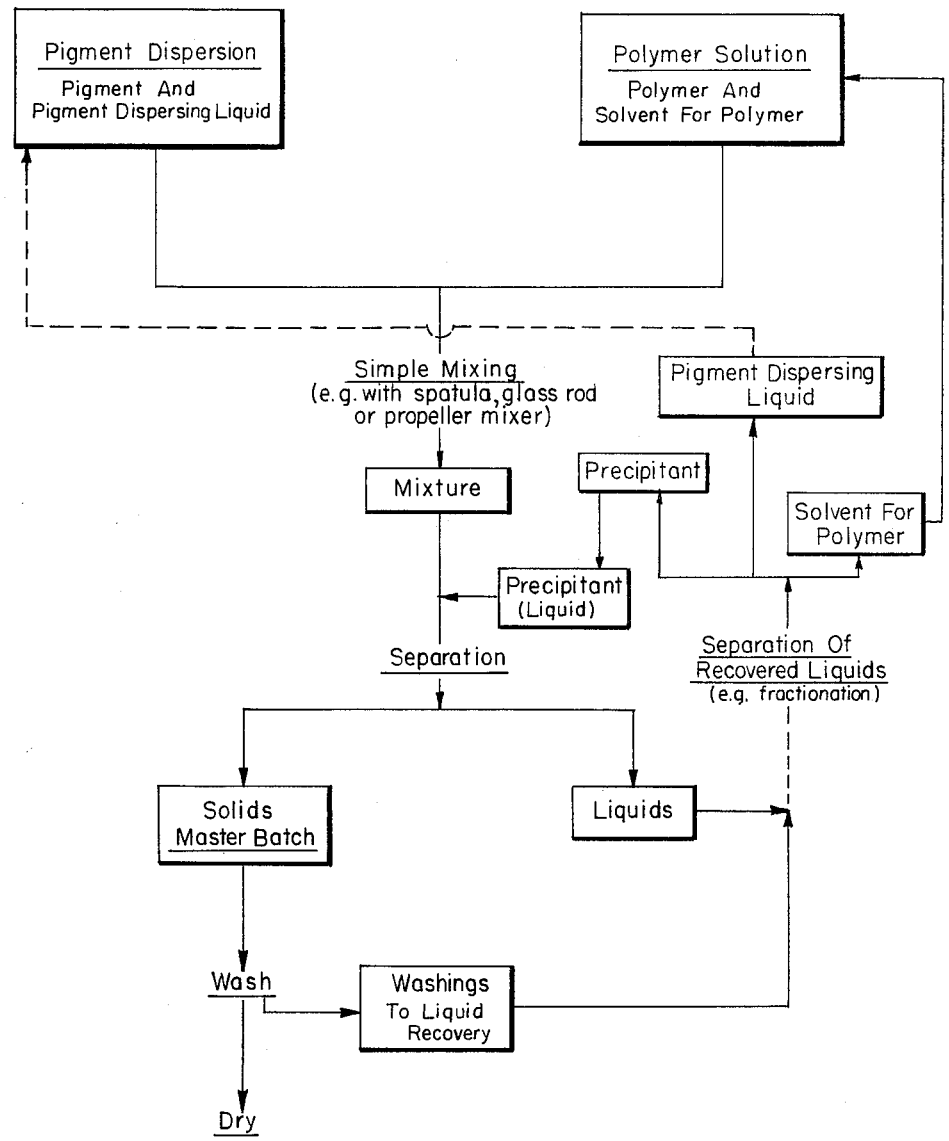
INVENTOR
Harold E. Weisberg
BY
ATTORNEYS

3,215,663
PROCESS FOR PIGMENT DISPERSION
Harold E. Weisberg, Silver Spring, Md., assignor to Mineral Pigments Corporation, Muirkirk, Md., a corporation of Maryland
Filed June 23, 1961, Ser. No. 119,172
7 Claims. (Cl. 260—41)

This invention relates to the dispersion of finely divided solids in plastics, resins, waxes, gums, rubber, or similar materials.

A principal object of the invention is to disperse pigments effectively in relatively hard synthetic polymeric materials, and the invention relates to the process whereby this is accomplished and to the resulting product.

Another object of the invention is to provide a method applicable generally to the formation of a uniform dispersion in a thermoplastic resin or other similar base material comprising finely divided solid material having an ultimate particle size of 1 micron or less.

For purposes of illustration, the invention will be described as it relates to the dispersion of a pigment in a thermoplastic resin, but it is to be understood that it is applicable to the dispersion of other solids of a similar nature in similar carrier materials.

The dispersion of pigments in synthetic resins such as poylamides, polycarbonates, polyolefins or other "hard" or high polymers is opposed by a property characteristic of most polymers, namely the property of inhibiting deflocculation. This property is strongly exhibited by polyelectrolyte resins in aqueous solution, especially and by other polymers in the pure state.

The method of the present invention overcomes this tendency in a simple and effective manner, illustrated schematically in the drawing in the nature of a flowsheet forming part of this specification.

As shown in the flowsheet, pigment, preferably in the form of flocculates of fine particles, e.g. in the form of press cake or dry color produced by any commonly used process is deflocculated by adding the aggregates of pigment particles, each individual particle of which has a particle size of about 1 micron or smaller, to a suitable liquid comprising the dispersing medium of this invention.

The liquids which have been found to be suitable dispersing media for finely divided pigments are those liquids possessing a relatively high dielectric constant. The specific value of the dielectric constant required for complete dispersion will vary with the particular pigment, but in general it has been found that the dispersing media should possess a dielectric constant of at least about 10 and preferably between about 25 and 45. For most pigments a liquid with a dielectric constant of less than 10 will fail to completely disperse the flocculates. Liquids with dielectric constants greater than 10 are preferred, it having been found that the higher the dielectric constant, the less tendency exists for the particles to persist in flocculated form and the more readily the dispersion is accomplished. The high dielectric liquid must also be compatible with certain other liquids used in carrying out the process as will appear below.

Typical pigments and suitable dispersing liquids are listed below, merely by way of example, it being evident that the lists are not intended to be exhaustive and that many other species of each may be utilized in the practice of the invention.

TABLE 1 (PIGMENTS)

| | |
|---|---|
| Titanium Dioxide | Cadmium Red |
| Zinc Oxide | Carbon Black |
| Chrome Yellow | Iron Oxide Yellow |
| Iron Blue | Iron Oxide Red |
| Phthalocyanine Blue | Various "Vat" Pigments |
| Phthalocyanine Green | Various Insoluble Azo Pigments |

TABLE 2 (DISPERSING LIQUIDS)

| | |
|---|---|
| Formamide | Glycerol |
| N-Methylformamide | p-Nitrotoluene |
| N,N-Dimethylformamide | n-Butanol |
| Dimethylsulfoxide | Cyclohexanone |
| Nitrobenzene | Benzonitrile |
| Ethanol | Pyridine |
| Methanol | Liquid HCN |
| Ethylene Glycol | Liquid $NH_3$ |
| Acetone | |

In instances where the pigment is a naturally occuring mineral—e.g. red iron oxide—in the form of crystalline aggregates of individual pieces considerably coarser than 1 micron, in another aspect of this invention the desired dispersion of pigment in high dielectric liquid may be obtained by grinding pigment in a comminuting apparatus such as a high energy attrition device, a colloid mill or the like, in the presence of suitable amounts of high dielectric liquids. While I do not understand the exact mechanism involved, I have found that the desired state of subdivision and dispersion is more readily obtained when the pigment is ground in the comminuting apparatus along with a sufficient amount of high dielectric liquid to give satisfactory fluidity.

The polymer in which the pigment is to be satisfactorily dispersed is dissolved in any known solvent or combination of solvents in order to prepare it to receive the pigment dispersion. If necessary the resin or solvent may be heated to facilitate the dissolution of the polymer.

At this point in the process, as shown in the drawing, the dispersion of pigment and the solution of resin are mixed. Mixing by hand, with a spatula, or even the mixing accomplished by pouring one into the other may suffice. Otherwise the two may be mixed in a low energy commercial-batch type propeller mixer. It will be particularly noted that no mixing of the type characteristic of prior art processes, e.g. high energy impact mixing, for securing an intimate admixture of resin and pigment is utilized in the process described.

The solvent for the resin and the dispersing medium utilized to disperse the pigment must be compatible with one another so that pigment and resin do not precipitate, flocculate or react in the uniform mixture or solution formed by bringing them together, and so that a uniform mixture persists from which the resin and pigment may both be precipitated, with the pigment in a highly dispersed condition throughout the coprecipitate. To this end, the solvent for the resin should be miscible with the high dielectric liquid and if possible it is preferred that the liquid utilized to disperse the pigment and the solvent for the resin be identical. Because of the foregoing requirement, water which is a high dielectric liquid cannot be used as the pigment dispersing medium because it is not compatible with the polymer solution.

However, for reasons of economy and availability, water is a particularly preferred precipitant, especially since the use of water simplifies the recovery of solvent and dispersing medium when the liquid present is separated from the coprecipitate in the next step in the process. The coprecipitate is the desired master batch, and after the coprecipitate is separated from the liquids, the coprecipitate is washed to remove any liquids physically retained therein, and is then dried. Finally, the coprecipitate may be ground lightly to break up any lumps or accretions which may have formed during the coprecipitation and washing.

In actual use, the dried "Master Batch" is blended with additional resin in the form of chip, powder, flake or molding granules, e.g. by simple mixing the master batch and the resin in suitable rotating or ribbon type blender, and dispersion of the pigment in the final product is then obtained by extruding or injection molding the mixture, often with the assistance of conventionally utilized mechanical dispersion aids in extruding or molding machines.

It will be readily appreciated that aside from the aesthetic values incident to uniform dispersion of the pigment in the resin there are often practical considerations which make uniformity of dispersion vital or critical.

For example when the pigmented product is to be drawn into filaments, the presence of clusters of pigment particles causes the fibers or filaments to be weakened in pigment-rich areas and to break in the drawing machine with loss of production, loss of time in retreading the machine and lack of uniformity in the product. Further when uniform physical properties are required in an end item of molded plastic, these cannot be obtained if the molded product has clumps of pigment non-uniformly dispersed therein.

From the above it will be seen that the chemistry of the pigment is not important, except that the pigment must be insoluble in the solvent systems used, and non-reactive therewith and the pigment must be of sufficiently small ultimate particle size such that mere deflocculation and dispersion will produce a particle size distribution suitable for proper coloring of the resin used, no great mechanical energy application being made to reduce aggregates to small size.

The method is particularly suited to synthetic pigments and to their use in the form of filter press cake although it may also be applied to dry colors in some instances.

The following examples will serve further to illustrate specific embodiments of the invention and are not intended to be construed as limitative thereof.

*Example 1*

Seventy grams of Merlon polycarbonate resin (Mobay Chemical Company) were dissolved in 700 ml. of dimethylformamide at 95° C. Separately 30 grams of phthalocyanine green pigment in the form of wet presscake were dispersed by vigorously agitating it in 300 ml. of dimethylformamide. The pigment dispersion was heated to 65° C. The pigment dispersion was then added to the resin solution with good agitation and the mixture was cooled to about 50° C. while continuing the agitation. At this point, the mixture had become a heavy slush. One liter of water was then added to the stirred slush. After about 30 minutes stirring, the mixture was filtered, the filter cake was washed free of dimethylformamide with water, and was dried in an oven at 110° C. The product was passed through a comminuting or pulverizing mill. The yield approaches 100% of a 30% pigment concentrate in which the pigment is completely dispersed. The concentrate was blended with additional polycarbonate resin and then molded. By miscroscopic examination of the molded product, the pigment was found to be uniformly dispersed in the products.

*Example 2*

Seventy grams of Zytel 31 nylon resin (E. I. duPont de Nemours and Company) were dissolved in 700 ml. of dimethylsulfoxide at 170° C. Separately 30 grams of a common channel carbon black (Godfrey L. Cabot's Monarch 81) were dispersed in 700 ml. of dimethylformamide by agitation. The pigment dispersion was heated to 100° C. and was added to the resin solution with vigorous agitation. The mixture was cooled to 90° C. while stirring and was diluted to twice its volume with water. After stirring for 30 minutes the product was recovered in the same manner as in Example 1 and utilized as the master batch in a conventional molding process and in an extruding process.

*Example 3*

Seventy grams of Profax 6511 polypropylene resin (Hercules Powder Company) were dissolved in 1600 ml. of Decalin at 150° C. Separately 30 grams of phthalocyanine blue pigment in the form of wet presscake were well stirred in 700 ml. of nitrobenzene in a reflux distillation apparatus equipped with a Dean-Stark water trap. The water present in the presscake was distilled out as a nitrobenzene-water azeotrope, B.P. 98.6° C., 88 vol. percent water. When water ceased to accumulate in the trap it was presumed absent and there remained an anhydrous dispersion of the pigment in nitrobenzene. The pigment dispersion was now heated to 150° C. and stirred rapidly and vigorously into the resin solution which had been heated to the same temperature. Stirring was continued until the mixture cooled to 100° C., at which time two volumes of dioxane were rapidly added. The master batch precipitated in fine granular form. It was filtered off, washed free of Decalin and nitrobenzene with dioxane, washed free of dioxane with water, and finished as in the previous examples.

The three synthetic resin polymers described in the foregoing examples are to be considered as illustrative since the method of this invention is applicable to the dispersion of finely divided solids in both polymers and copolymers of other vinylidene monomers generally, although for economic reasons it may not find wide application when using polymers in which pigments are dispersed with relative ease. Copolymers of butadiene, styrene and acrylonitrile are typical of the copolymeric materials to which the invention may be advantageously applied.

Having now described the invention in accordance with the patent statutes, it is to be understood that it is not intended that the invention is in any way limited to the specific description, and that it is limited only as defined in the appended claims.

I claim:

1. A process for dispersing pigments in an organic synthetic high molecular weight linear polymer selected from the group consisting of polycarbonate, polyamide and polypropylene resins, the resulting product being intended for molding or extrusion comprising the following steps:

(1) dispersing finely divided pigment particles no larger than about 1 micron in a dispersing liquid having a dielectric strength greater than about 10;

(2) separately dissolving said synthetic resin polymer in solvent said dispersing liquid being compatible with the resulting polymer solution;

(3) mixing the dispersion of pigment particles and the solution of resin polymer in proportions which do not prematurely flocculate to produce a mixture thereof;

(4) coprecipitating the pigment and polymer by adding a liquid to the mixture;

(5) separating the coprecipitated solids from the accompanying liquid; and (6) recovering the coprecipitate which comprises the desired dispersion of pigment in synthetic resin polymer.

2. The process of claim 1 wherein the liquid dispersing medium has a dielectric strength between about 25 and 45.

3. The process of claim 2 wherein the polymer is a polycarbonate resin.

4. The process of claim 1 wherein the pigment particles are no larger than about 1 micron and the particles have been reduced to the desired state of subdivision by grinding the pigment in the presence of at least a portion of dispersing liquid.

5. The process of claim 1 wherein the pigment dispersion and polymer solution are each formed before they are mixed with one another.

6. The process of claim 1 including in addition the separate recovery of the liquid accompanying the coprecipitate and effecting the separation of said liquid into fractions comprising pigment dispersing medium, solvent for the organic polymer and liquid precipitant, and recycling of each of said fractions to said process.

7. The process of claim 1 wherein the recovered solids are used as a master batch in a molding process, by mixing said solids with additional unpigmented polymer material and molding the resulting mixture.

References Cited by the Examiner

UNITED STATES PATENTS

| | | | |
|---|---|---|---|
| 2,829,982 | 4/58 | Hoyt | 260—37 XR |
| 2,849,414 | 8/58 | Stott | 260—37 |
| 2,849,415 | 8/58 | Stott | 260—37 |
| 2,988,782 | 6/61 | Parrish et al. | 260—37 XR |
| 2,992,124 | 7/61 | Campbell | 260—37 XR |
| 3,060,145 | 10/62 | Moscrip | 260—34.2 |
| 3,112,292 | 11/63 | Bottenbruch et al. | 260—47 X |

FOREIGN PATENTS 158,769  4/52  Australia.

OTHER REFERENCES

Alexander: "Colloid Chemistry," vol. VI, 1946, page 311.

MORRIS LIEBMAN, *Primary Examiner.*

MILTON STERMAN, *Examiner.*